United States Patent
McReynolds et al.

(10) Patent No.: US 7,020,186 B2
(45) Date of Patent: Mar. 28, 2006

(54) MULTI-MODE BI-DIRECTIONAL COMMUNICATIONS DEVICE INCLUDING A DIPLEXER HAVING SWITCHABLE LOW PASS FILTERS

(75) Inventors: Kevin Paul McReynolds, Noblesville, IN (US); Michael Anthony Pugel, Noblesville, IN (US); Wesley John Boyd, Cedar Rapids, IA (US)

(73) Assignee: Thomson Licensing, Boulogne-Billancourt (FR)

( * ) Notice: Subject to any disclaimer, the term of this patent is extended or adjusted under 35 U.S.C. 154(b) by 842 days.

(21) Appl. No.: 10/043,679

(22) Filed: Jan. 11, 2002

(65) Prior Publication Data

US 2003/0012271 A1    Jan. 16, 2003

Related U.S. Application Data

(60) Provisional application No. 60/327,551, filed on Oct. 2, 2001, provisional application No. 60/305,218, filed on Jul. 13, 2001.

(51) Int. Cl.
  *H04B 1/38* (2006.01)
  *H04L 5/16* (2006.01)

(52) U.S. Cl. .......... 375/219; 370/376; 455/73; 710/1

(58) Field of Classification Search .......... 370/276; 375/219; 455/73, 1
See application file for complete search history.

(56) References Cited

U.S. PATENT DOCUMENTS

| | | | |
|---|---|---|---|
| 4,397,037 A | 8/1983 | Theriault | 455/188 |
| 4,480,338 A | 10/1984 | Dobrovolny | 455/188 |
| 4,499,495 A | 2/1985 | Strammello | 358/188 |
| 4,912,436 A | 3/1990 | Alford et al. | 333/135 |
| 5,719,792 A | 2/1998 | Bush | 364/574 |
| 5,870,134 A | 2/1999 | Laubach et al. | 348/12 |
| 5,881,369 A | 3/1999 | Dean et al. | 455/78 |
| 5,986,691 A | 11/1999 | Henderson | 348/12 |
| 6,072,993 A | 6/2000 | Trikha et al. | 455/78 |
| 6,075,972 A | 6/2000 | Laubach et al. | 455/5.1 |
| 6,118,672 A | 9/2000 | Yamauchi et al. | 361/818 |
| 6,124,766 A | 9/2000 | Matsuura | 331/117 R |
| 6,131,023 A | 10/2000 | Matsuura | 455/301 |

(Continued)

OTHER PUBLICATIONS

Frequently Asked Questions, How does data over coaxial cable work, 2001-2004 Coaxial Networks, Inc, http://www.coaxialnetworks.com/faq.htm.*

(Continued)

*Primary Examiner*—Stephen Chin
*Assistant Examiner*—Erin M. File
(74) *Attorney, Agent, or Firm*—Joseph J. Laks; Ronald H. Kurdyla; Guy H. Eriksen

(57) ABSTRACT

A multi-mode bi-directional communications device including a diplexer having a high-pass filter, a first low-pass filter, and a second low-pass filter. Downstream processing circuitry is coupled to the high-pass filter, and upstream processing circuitry is selectively coupled to the first low-pass filter and the second low-pass filter in response to an indicium of a desired spectral region.

28 Claims, 3 Drawing Sheets

U.S. PATENT DOCUMENTS

| | | | |
|---|---|---|---|
| 6,160,572 A | 12/2000 | Matsuura | 348/11 |
| 6,169,569 B1 | 1/2001 | Widmer et al. | 348/11 |
| 6,285,706 B1 | 9/2001 | Skinker et al. | 375/222 |
| 6,295,554 B1 | 9/2001 | Karadogan et al. | 709/219 |
| 6,512,416 B1* | 1/2003 | Burns et al. | 330/129 |
| 2002/0137471 A1* | 9/2002 | Satoh et al. | 455/83 |

OTHER PUBLICATIONS

Lj. Ristic et al., RF Module Solutions for the Wireless Handset Market, Part 1: Switch-Filter Modules, Nov. 2001, MP Digest, http://www.mpdigest.com/Articles/Nov2001/alpha/Default.htm.*

* cited by examiner

MULTI-MODE BI-DIRECTIONAL COMMUNICATIONS DEVICE INCLUDING A DIPLEXER HAVING SWITCHABLE LOW PASS FILTERS

CROSS REFERENCE TO RELATED APPLICATIONS

This patent application claims the benefit of U.S. Provisional Application Ser. No. 60/305,218, filed Jul. 13, 2001, which is incorporated herein by reference in its entirety, and U.S. Provisional Application Ser. No. 60/327,551, filed Oct. 2, 2001, which is also incorporated herein by reference in its entirety. This patent application is related to simultaneously filed U.S. patent application Ser. No. 10/043,700, filed Jan. 11, 2002, entitled MULTI-MODE BIDIRECTIONAL COMMUNICATIONS DEVICE INCLUDING A DIPLEXER HAVING A SWITCHABLE NOTCH FILTER; and U.S. patent application Ser. No. 10/043,497, filed Jan. 11, 2002, entitled MULTI-MODE DOWNSTREAM SIGNAL PROCESSING IN A BI-DIRECTIONAL COMMUNICATIONS DEVICE, both of which are incorporated herein by reference in their entireties.

FIELD OF INVENTION

The present invention relates to diplexers. More particularly, the invention relates to a single diplexer suitable for use in multiple standard systems such as both the North American Data Over Cable Service Interface Specifications (DOCSIS®) and the European DOCSIS® standards.

BACKGROUND OF INVENTION

Bi-directional communication devices, such as cable modems, have been designed to specifically operate under a single standard, such as the North American Data Over Cable Service Interface Specifications (DOCSIS®) or the European DOCSIS® standards. The European version of the North American DOCSIS® standard was not available when DOCSIS® was first proposed to European customers. Many European cable operators started deploying the North American DOCSIS® standard. They now express the need to change to a European DOCSIS®-compliant system.

There are three main differences between a European DOCSIS® cable modem and a North American DOCSIS® cable modem. First, a diplexer within the cable modem has a different cross over point in the European and North American systems, since the forward (downstream) and the return (upstream) data channel bandwidths on the coax cable are slightly different. This difference in diplexer crossover point is realized by different high pass filter and low pass filter cutoff frequencies between the European and North American systems. Second, the forward data channel is 8 MHz wide for European DOCSIS®, while in the North American DOCSIS® the forward data channel is 6 MHz wide. This requires a different surface acoustic wave (SAW) filter to maximize performance when additional channels are located next to the desired channel without any guard band. Third, the forward data channel for the European DOCSIS® uses a different forward error correction (FEC) scheme than is used in the North American DOCSIS®. Providing a single cable modem that could operate under both the North American and European standard systems would reduce the costs for the manufacturers, re-sellers, and renters by economy of scale.

SUMMARY OF INVENTION

The disadvantages heretofore associated with the prior art, are overcome by the present invention of a multi-mode bi-directional communications device including a diplexer having a high-pass filter, a first low-pass filter, and a second low-pass filter. Downstream processing circuitry is coupled to the high-pass filter, and upstream processing circuitry is selectively coupled to the first low-pass filter and the second low-pass filter.

A method of passing bi-directional communications signals of differing modes through a diplexer having a high-pass filter coupled between a first and a second signal port, a first and a second low-pass filter selectively coupled between the first and a third signal port is also provided. In particular, the method includes receiving downstream signals at the first signal port and filtering the received downstream signals using the high-pass filter. The filtered downstream signals are then communicated to the second signal port. Furthermore, the method includes receiving upstream signals at the third signal port, selecting one of the first or second low-pass filters for filtering the received upstream signals in response to a desired communications mode, and sending the filtered signals to the first signal port.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

While the invention will be primarily described within the context of a cable modem in a data communications system, it will be appreciated by those skilled in the art that other multi-mode/standard, bi-directional communications devices, such as a satellite terminal, a digital subscriber line (DSL) modem, and the like may benefit from the present invention. According to one embodiment of the invention, a cable modem includes a single diplexer, which is used to facilitate the coupling of, for example, a computer device to a service provider via a cable transport network. In particular, the exemplary cable modem is utilized to provide downstream broadband data signals from the service provider to the computer device. Additionally, the exemplary cable modem is utilized to transfer upstream baseband data signals from the illustrative computer back to the service provider. More specifically, the exemplary cable modem is capable of selectively operating within the different downstream bandwidth constraints under both the North American Data Over Cable Service Interface Specifications (DOCSIS®) and the European DOCSIS® standards, which are incorporated by reference herein in their respective entireties. The cable modem is also capable of selectively passing through upstream data signals in compliance with both the European and North American DOCSIS® standards.

Figure 1:
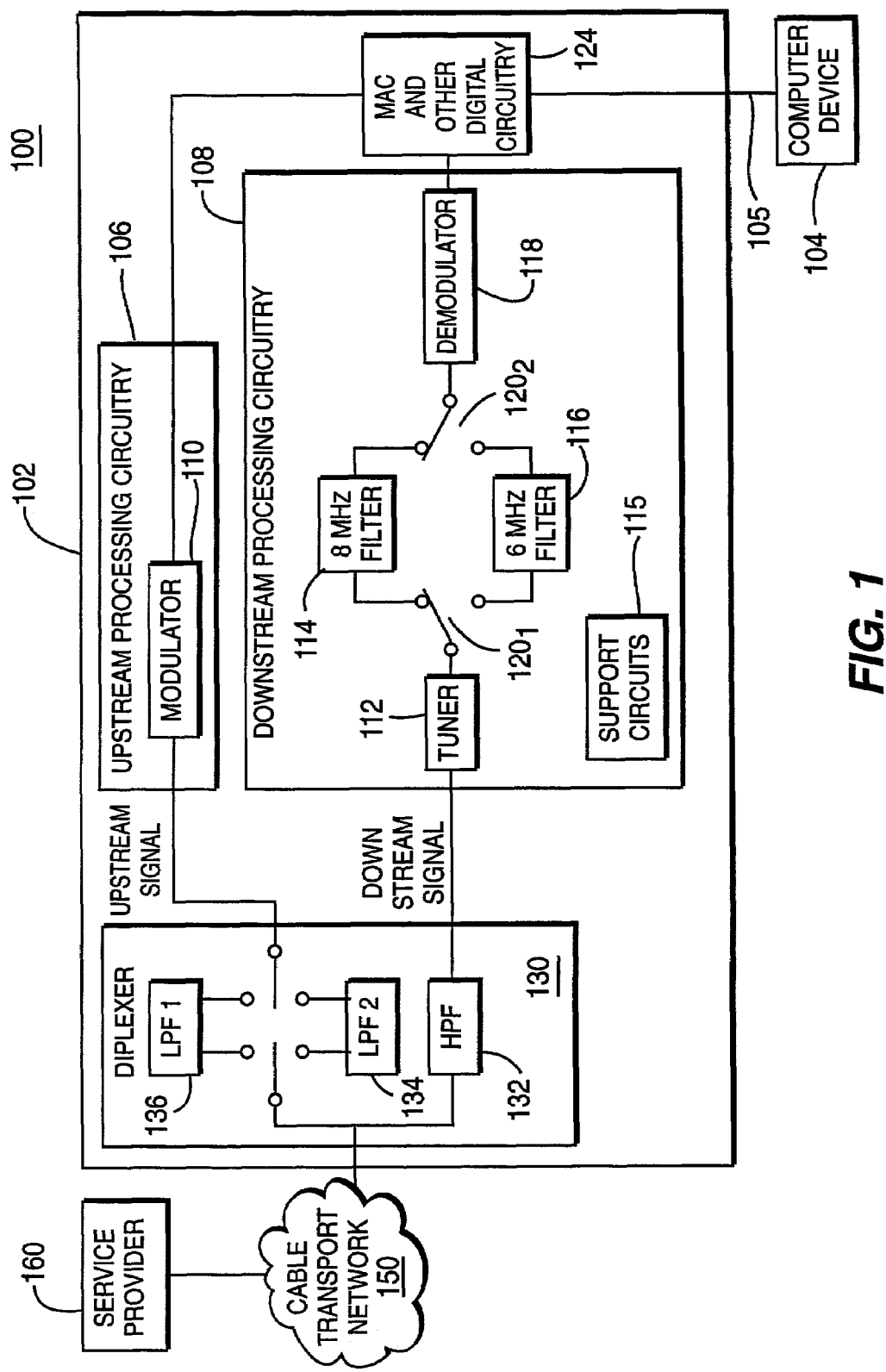
FIG. 1 depicts a block diagram of a data communications system having a multi-mode bi-directional communications device according to an embodiment of the present invention.

FIG. 1 depicts a block diagram of a data communications system 100 having a multi-mode bi-directional communications device 102 according to an embodiment of the present invention. The data communications system 100 comprises a service provider 160 that provides electronically transmitted, digital data to an end user having an input/output (I/O) device 104, such as a computer, hand-held device, laptop, or any other device capable or transmitting and/or receiving data. The service provider 160 is coupled to the multi-mode bi-directional communications device (e.g., cable modem) 102 via a cable transport network 150.

The service provider 160 may be any entity capable of providing low, medium and/or high-speed data transmission, multiple voice channels, video channels, and the like. In particular, data is transmitted via radio frequency (RF) carrier signals by the service provider 160 in formats such as the various satellite broadcast formats (e.g., Digital Broadcast Satellite (DBS)), cable transmission systems (e.g., high definition television (HDTV)), DVB-C (i.e., European digital cable standard), and the like.

The service provider 160 provides the data over the cable transport network 150. In one embodiment, the cable transport network 150 is a conventional bi-directional hybrid fiber-coax cable network, such as specified under the North American or European DOCSIS® standards.

In operation, the service provider 160 modulates the downstream data signals with an RF carrier signal, and provides such signals via the cable transport network 150 to the cable modem 102, where the RF signals are received, tuned, and filtered to a predetermined intermediate frequency (IF) signal. The IF signal is then demodulated into one or more respective baseband signals, and otherwise processed into, illustratively, data packets. The data packets are further transmitted through, illustratively, cabling 105 (e.g., universal serial bus (USB), coaxial cable, and the like) to the computer device 104. Similarly, a user of the computer device 104 may send upstream data signals to the cable modem 102 via the cabling 105. The cable modem 102 receives upstream baseband data signals from the computer device 104, and then modulates and upconverts the data signals onto a RF carrier for transmission back to the service provider 160, via the cable transport network 150.

The cable modem 102 comprises a diplexer 130, upstream processing circuitry 106, downstream processing circuitry 108, and a media access controller (MAC) 124. The diplexer 130 communicates data between the cable transport network 150 and the cable modem 102. The diplexer 130 comprises a high-pass filter 132 and two low-pass filters 134 and 136. The high-pass filter 132 provides processed downstream RF signals to the computer device 104. In particular, RF signals having a frequency greater than, e.g., 88 MHz are passed through, while those frequencies below 88 MHz are filtered.

The diplexer 130 is coupled to the upstream and downstream processing circuitry 106 and 108. The high-pass filter HPF 132 passes the downstream data signals to the downstream processing circuitry 108 and the low-pass filters LPF1 and LPF2 136 and 134 receive return signals (e.g., user requests) from the upstream processing circuitry 106.

As discussed above, the LPF1 136 is illustratively switched on during operation under the European DOCSIS standard, while the LPF2 134 is illustratively switched on during operation under the North American DOCSIS® standard.

The downstream processing circuitry 108 comprises the tuner 112, a demodulator 118, which is selectively coupled to the tuner 112 through a first surface acoustic wave (SAW) filter 114 or through a second SAW filter 116, and other support circuitry 115, such as voltage regulators, amplifiers, and the like. The tuner 112 may illustratively be model type DIT9210, manufactured by Thomson Consumer Electronics, Inc. When operating under the European DOCSIS® mode, the first SAW filter 114 provides an IF signal having an 8 MHz bandwidth to the demodulator 118, which operates within the requirements under the ITU J.83 Annex A standard. Alternately, when operating under the North American DOCSIS® mode, the second SAW filter 116 provides an IF signal having a 6 MHz bandwidth to the demodulator 118, which then operates within the requirements under the ITU J.83 Annex B standard. Although, the illustrative embodiment depicts a single demodulator 118, one skilled in the art will recognize that separate modulators operating under the ITU J.83 Annex A and B standards may alternately be utilized.

The downstream processing circuitry 108 selectively tunes, demodulates, and otherwise "receives" at least one of a plurality of downstream data signals in response to a selection signal provided by, for example, the computer device 104. The diplexer 130 passes all downstream data signals above 88 MHz to the tuner 112 via the high-pass filter HPF 132. The tuner 112 downconverts the received downstream RF signals from the HPF 132 to a predetermined IF frequency signal. At least one switch selectively passes the IF frequency signal from the tuner 112 to the demodulator 118 via either the first SAW filter 114 or the second SAW filter 116. In one embodiment, the first and second SAW filters 114 and 116 are each coupled between the tuner 112 and demodulator 118, in parallel, via electronic switching devices $120_1$, and $120_2$ (collectively "switches" 120), such as PIN diodes. That is, each illustrative PIN diode functions as an electronic switch for selectively coupling and decoupling each of the SAW filters 114 and 116 between the tuner 112 and the demodulator 118.

For example, a first PIN diode (not shown), which is coupled to the first SAW filter 114, is forward biased by a controller (not shown) to allow the first PIN diode to act as a short circuit as between the tuner 112 to the first SAW filter 114. As such, the first SAW filter 114 is coupled to the tuner 112. Additionally, a second PIN diode (not shown), which is coupled between the tuner 112 and the second SAW filter 116, is reversed biased by the controller to allow the PIN diode to act as an open circuit as between the tuner 112 to the second SAW filter 116. As such, the second SAW filter 116 is decoupled from the tuner 112. In this manner, only one of the two SAW filters is coupled to the tuner 112 at a time. Additionally, in a similar manner, a third and fourth PIN diode (not shown) may be utilized in conjunction with the controller to couple and decouple the first and second SAW filters 114 and 116 to the demodulator 118. One skilled in the art will recognize that other switching components (e.g., transistors, electro-mechanical switches, and the like) and circuits may be utilized to selectively couple and decouple the SAW filters 116 and 114 to the tuner 112 and demodulator 118. The downconverted IF signals are demodulated by the downstream processing circuitry 108 to provide one or more respective baseband signals, which are transferred to the computer device 104 for processing.

When operating under the North American DOCSIS® standard, the exemplary second SAW filter 116 provides a 44 MHz centered IF signal having a 6 MHz bandwidth to the demodulator 118, where the demodulator 118 extracts the baseband signal(s) therein. Similary, when operating under the European DOCIS® standard, the exemplary first SAW filter 114 provides a 36.125 MHz centered IF signal having an 8 MHz bandwidth to the demodulator 118, where the demodulator 118 extracts the baseband signal(s) therein. In any case, the baseband signals are sent to the media access controller (MAC) 124 for subsequent transport to the computer device.

The baseband signals are illustratively formed into packets (e.g., MPEG elementary stream packets). The media access controller and other digital circuitry 124 may further process the packetized data (e.g., attach or encapsulate in appropriate transport packets) and then distribute the processed, packetized data to the computer devices 104.

The upstream processing circuitry 106 comprises a modulator 110 and other support circuits such as amplifiers, filters, voltage regulators, and the like (not shown). The modulator 110 modulates upstream signals from the computer device 104 for subsequent transmission to the service provider 160. In particular, a user sends data, data requests, or some other user request to the service provider. The user request is up converted and modulated to an upstream RF signal.

Figure 2:
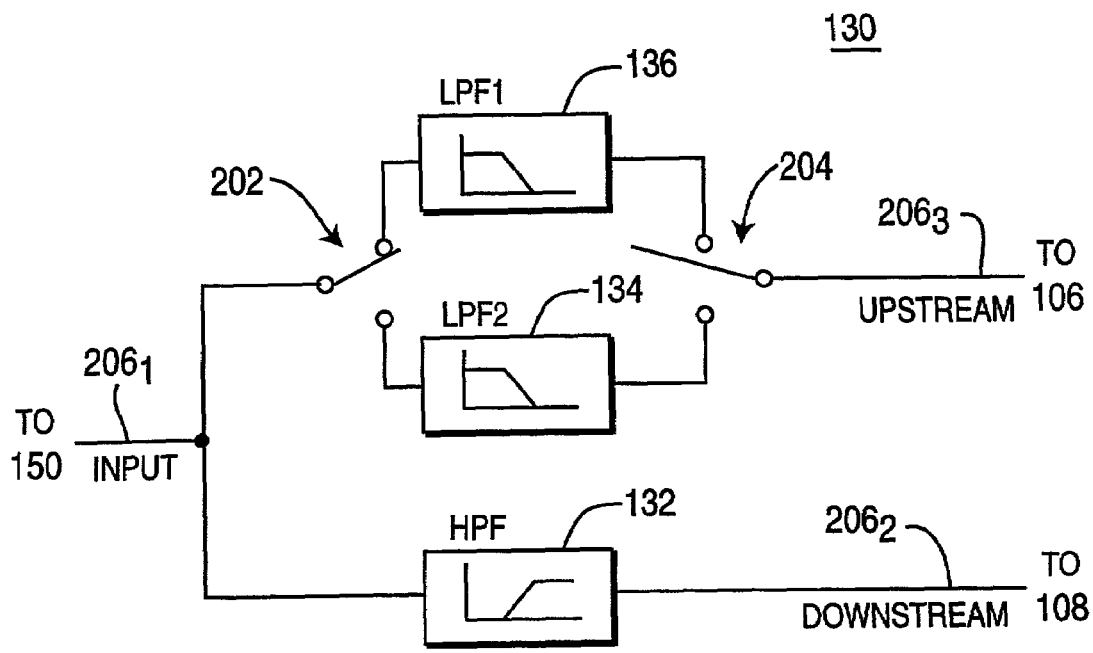
FIG. 2 depicts a block diagram of a diplexer suitable for use in the multi-mode bi-directional communications device of FIG. 1.

FIG. 2 depicts a block diagram of a diplexer 130 according to the present invention. A high-pass filter 132 is coupled between a first signal port $206_1$ and a second signal port $206_2$. The high-pass filter 132 provides an RF frequency path to the downstream processing circuitry 108 from the cable transport network 150, as discussed above. Additionally, first and second low-pass filters LPF1 136 and LPF2 134 are coupled between the first signal port $206_1$ and a third signal port $206_3$. The two low-pass filters LPF1 136 and LPF2 134 are independently selected, via switches 202 and 204, to alternately provide an RF frequency path from the upstream processing circuitry 106 to the cable transport network 150. For example, LPF1 136 of the diplexer 130 is illustratively selected when the cable modem 102 is serially connected to a computer device 104 operating under the European DOCSIS® standard. Alternately, LPF2 134 of the diplexer 130 is selected when the cable modem 102 is operating under the North American DOCSIS® standard.

Figure 3:
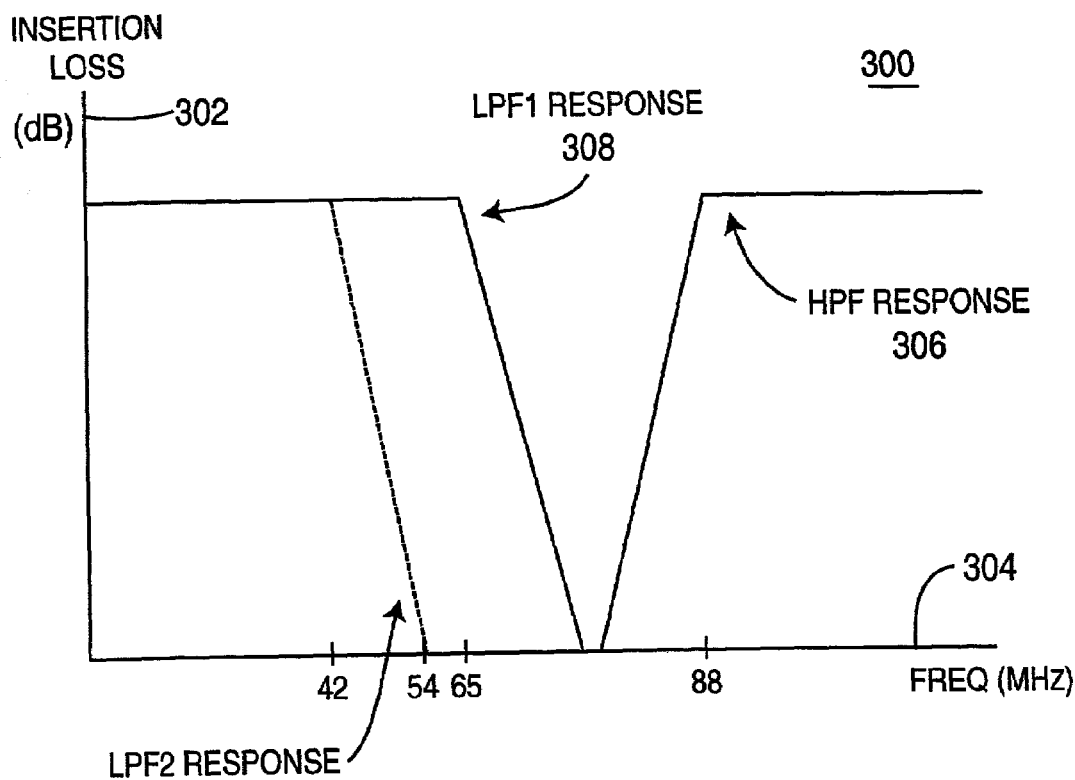
FIG. 3 depicts a graphical representation of a response curve for the diplexer FIG. 2.

FIG. 3 depicts a graphical representation of a response curve 300 for the diplexer of FIG. 2, and should be viewed along with FIG. 2. The response curve 300 comprises an ordinate 302 and an abscissa 304. The ordinate 302 represents insertion loss (measured in decibels (dB)), and the abscissa 304 represents frequency (measured in megahertz (MHz)).

Referring to FIGS. 2 and 3 together, it can be seen that the high-pass filter HPF 132 passes RF signals having a frequency greater than 88 MHz. Under the North American DOCSIS® standard, the downstream data signals are transmitted at a frequency greater than 88 MHz, while under the European DOCSIS® standard the downstream data signals are transmitted at a frequency greater than 110 MHz. In this case, only a single high-pass filter HPF 132 is utilized in the diplexer 130. Specifically, the HPF 132 passes RF data signals above a frequency of 88 MHz. Since all downstream RF signals are above 88 Mhz, the single HPF 132 is suitable for passing through such downstream RF data signals for further processing in the cable modem 102 under both the North American and European DOCSIS® standards. The HPF response curve 306 in FIG. 3 illustratively depicts a low-level insertion loss 302 for frequencies greater than 88 MHz.

Under the North American DOCSIS® standard, the upstream data signals are transmitted in a frequency range between 5 Mhz and 42 MHz, while under the European DOCSIS® standard the upstream data signals are transmitted in a frequency range between 5 MHz and 65 MHz. In this case, two low-pass filters LPF1 and LPF2 136 and 134 are provided to pass through data signals up to either 65 MHz or 42 MHz. In particular, the LPF2 low-pass filter 134 illustratively passes through the upstream data signals having a frequency between 5 Mhz and 42 MHz, as required under the North American DOCSIS® standard. Similarly, the LPF1 low-pass filter 136 illustratively passes through the upstream data signals having a frequency between 5 MHz and 65 MHz, as required under the European DOCSIS® standard. The LPF1 response curve 308 in FIG. 3 illustratively depicts a low-level insertion loss 302 for frequencies less than 65 MHz when operating under the European DOCSIS standard. Furthermore, the LPF2 response curve 310 in FIG. 3 illustratively depicts a low-level insertion loss 302 for frequencies less than 42 MHz when operating under the North American DOCSIS® standard.

Referring to FIG. 2, switches 202 and 204 are schematic representation for selectively coupling and decoupling either the first low-pass filter LPF1 136 or the second low-pass filter LPF2 134, thereby permitting the diplexer 130 to be set for operation under either DOCSIS® standards. In one embodiment, switches 202 and 204 may be electro-mechanical devices (e.g., relays). Preferably, the switches 202 and 204 are digitally operable switches, such as PIN diodes, transistors, and the like, controlled by a controller, such as a microprocessor, which generates a control voltage or current to activate the switches 202 and 204. For example, when switches 202 and 204 couple the cable transport network 150 to the LPF1 low-pass filter 136, the diplexer 130 is set pass frequencies less than 65 MHz, as set forth under the European DOCSIS® standard. Similarly, when switches 202 and 204 couple the cable transport network 150 to the LPF2 low-pass filter 134, the diplexer 130 is set pass frequencies less than 42 MHz, as set forth under the North American DOCSIS® standard.

It is noted that two separate filters (e.g., the low-pass filters LPF1 136 and LPF2 134) are utilized for passing the upstream RF signal, as compared to only a single high-pass filter HPF 132 being utilized to pass downstream RF signals. It is further noted that a single low-pass filter may not be used for both the North American and European cable modems. In particular, there are stringent limits on the energy that can be transmitted upstream in the frequency band above the upstream data band. For example, the low-pass filter for the North American system must have low attenuation for frequencies between 5 and 42 MHz and high attenuation for frequencies above 54 MHz (see response curve 310). The low-pass filter for the European system must have low attenuation for frequencies between 5 and 65 MHz and high attenuation for frequencies above 88 MHz (see response curve 308). The requirements between 54 and 65 MHz are in direct conflict, therefore different responses, and hence, different low-pass filters are required under each DOCSIS® standard.

Figure 4:
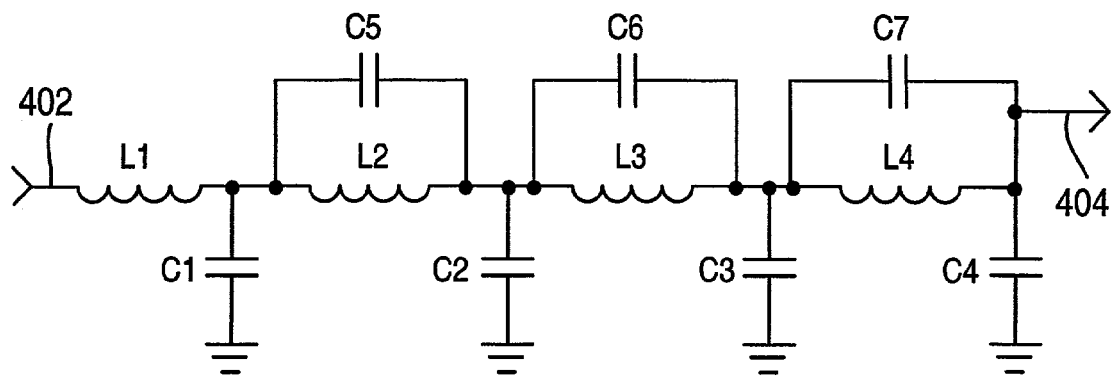
FIG. 4 depicts an illustrative schematic diagram of a first low-pass filter LPF1 of the diplexer of FIG. 2.
Figure 5:
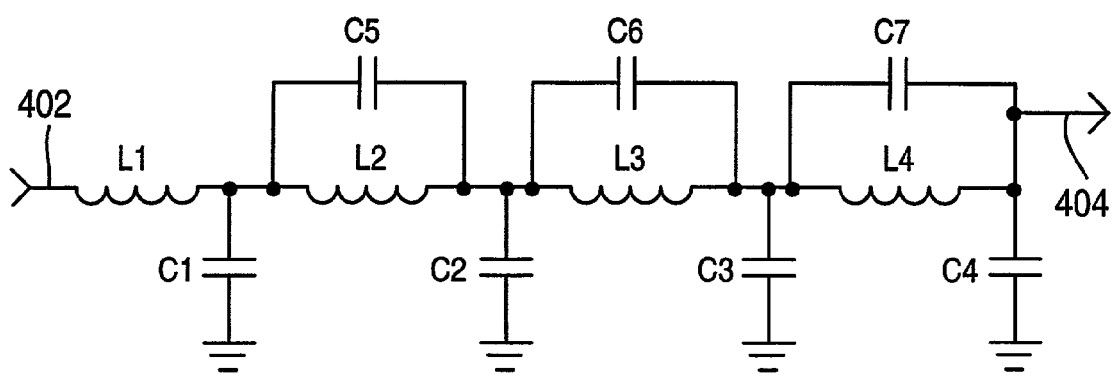
FIG. 5 depicts an illustrative schematic diagram of a second low-pass filter LPF2 of the diplexer of FIG. 2.
Figure 6:
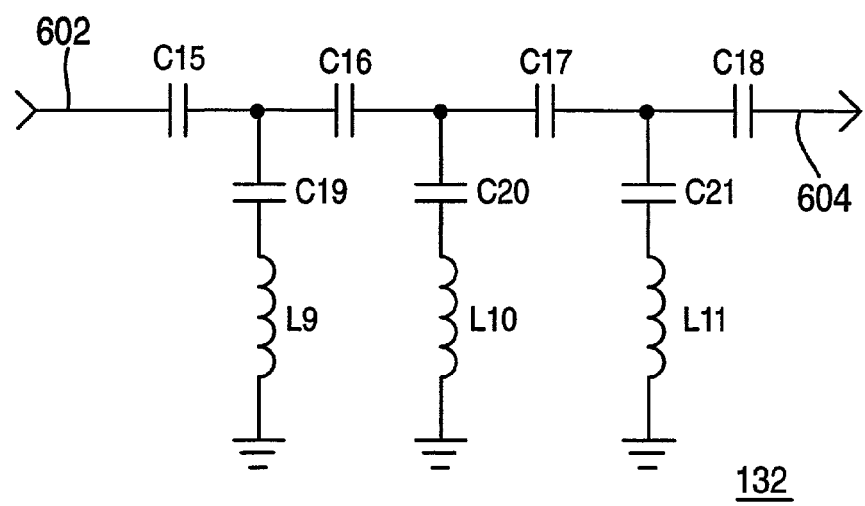
FIG. 6 depicts an illustrative schematic diagram of a high-pass filter HPF of the diplexer of FIG. 2.

FIGS. 4, 5, and 6 depict illustrative schematic representations of the components in the diplexer 130. In general, the first and second low-pass filters LPF1 136 and LPF2 134 comprise a plurality of inductors connected in series between the first and third signal ports $206_1$ and $206_3$, each of the inductors being coupled to ground via a respective capacitor forming thereby a plurality of single pole filter elements, a portion of the inductors being bypassed by respective capacitors.

In particular and referring to FIGS. 4 and 5, the first and second low-pass filters LPF1 136 and LPF2 134 each comprise inductors L1 through L4 coupled to capacitors C1 through C7. In particular, the respective inductors L1 through L4 are coupled end-to-end in series, where inductor L1 is coupled to an input 402 and L4 is coupled to an output. Furthermore, capacitor C1 is coupled from ground to the node between L1 and L2. Capacitor C2 is coupled from ground to the node between L2 and L3. Capacitor C3 is coupled from ground to the node between L3 and L4. Capacitor C4 is coupled to the output 404 and ground. Additionally, capacitor C5 is coupled in parallel with inductor L2, capacitor C6 is coupled in parallel with inductor L3, and capacitor C7 is coupled in parallel with inductor L4. Table 1 depicts the preferred embodiments of the respective values of the inductors L1–L4 and capacitors C1–C7 of the first and second low-pass filters LPF1 136 and LPF2 134, where inductor and capacitance values are illustratively measured, respectively, in nano Henry and pico farads.

operated under multiple standards, for example, between the European and North American DOCSIS® standards. The diplexer 130 utilizes a single high-pass filter HPF 132 to adjust the cutoff frequency of the diplexer's forward (e.g., downstream) channel, and switches between two low-pass filters LPF1 136 and LPF2 134 to adjust the cutoff frequency of the diplexer's return (e.g., upstream) channel. It should be apparent to those skilled in the art and informed by the present disclosure that a novel diplexer for passing RF signals for multi standard data communication systems operating, illustratively, under both the North American and European DOCSIS® standards has been provided. It should also be noted that FIG. 1 depicts the upstream processing circuitry 106, downstream circuitry 108, and media access controller 124 as separate components. However, one skilled in the art will understand that these illustratively distinct components may also be fabricated, for example, as a single integrated circuit (e.g., ASIC) as well.

Although various embodiments that incorporate the teachings of the present invention have been shown and described in detail herein, those skilled in the art can readily devise many other varied embodiments that still incorporate these teachings.

TABLE 1

| LPF1 (FIG. 4) | | | | LPF2 (FIG. 5) | | | | HPF (FIG. 6) | | | |
|---|---|---|---|---|---|---|---|---|---|---|---|
| L | (nH) | C | (pF) | L | (nH) | C | (pF) | L | (nH) | C | (pF) |
| L1 | 154 | C1 | 47 | L1 | 330 | C1 | 62 | L9 | 210 | C15 | 15 |
| L2 | 185 | C2 | 33 | L2 | 240 | C2 | 55 | L10 | 310 | C16 | 150 |
| L3 | 150 | C3 | 40 | L3 | 225 | C3 | 62 | L11 | 160 | C17 | 13 |
| L4 | 140 | C4 | 15 | L4 | 290 | C4 | 57 | | | C18 | 12 |
| | | C5 | 10 | | | C5 | 33 | | | C19 | 72 |
| | | C6 | 12 | | | C6 | 41 | | | C20 | 69 |
| | | C7 | 5 | | | C7 | 16 | | | C21 | 93 |

In general, the high-pass filter HPF 132 comprises a plurality of capacitors connected in series between the first and the second signal ports $206_1$ and $206_2$, each of the capacitors being coupled to ground via serially coupled circuit elements forming thereby a plurality of single pole filter elements, each of the serially coupled circuit elements comprising a capacitor and inductor. In particular and referring to FIG. 6, the high-pass filter HPF 132 comprises inductors L9 through L11 coupled to capacitors C15 through C21 for passing frequencies greater than 88 MHz. In particular, capacitors C15 through C18 are coupled end-to-end in series, where capacitor C1 is coupled to an input 602 and C18 is coupled to an output 604 of the HPF filter 132. Capacitor C19 is coupled to the node between capacitors C15 and C16 and serially coupled to inductor L9, which is coupled to ground. Capacitor C20 is coupled to the node between capacitors C16 and C17 and serially coupled to inductor L10, which is coupled to ground. Capacitor C21 is coupled to the node between capacitors C17 and C18 and serially coupled to inductor L10, which is coupled to ground. Table 1 also depicts a preferred embodiment of the values of the inductors and capacitors L9–L11 and C15–C21 of the high-pass filter HPF 132.

FIGS. 4, 5, and 6 depict one of many possible embodiments to implement a multi-mode bi-directional communications device (e.g., cable modem) 102, which can be

What is claimed is:

1. A muti-mode bi-directional communications device, comprising
 a diplexer including a high-pass filter, a first low-pass filter, and a second low-pass filter;
 downstream processing circuitry coupled to the high-pass filter; and
 upstream processing circuitry selectively coupled to the first low-pass filter and the second low-pass filter,
 wherein the downstream processing circuitry comprises:
 a tuner;
 a demodulator;
 a first SAW filter selectively coupled between said tuner and said demodulator; and
 a second SAW filter selectively coupled between said tuner and said demodulator.

2. The device of claim 1, wherein the first SAW filter has a bandwidth of 6 MHz and the second SAW filter has a bandwidth of 8 MHz.

3. The device of claim 1, further comprising at least one first selector for selectively coupling the first SAW filter and the second SAW filter between the tuner and the demodulator.

4. The device of claim 1, wherein said high-pass filter passes signals greater than 88 MHz.

5. The device of claim 1, wherein the first low-pass filter passes signals less than 65 MHz and the second low-pass filter passes signals less than 42 MHz.

6. The device of claim 1, further comprising at least one selector for selectively coupling the first low-pass filter and the second low-pass filter to the upstream processing circuitry.

7. The device of claim 1, wherein said device is a cable modem.

8. The device of claim 1, wherein said device supports multiple standards.

9. A diplexer, comprising:
a high-pass filter coupled between a first signal port and a second signal port;
a first low-pass filter coupled between said first signal port and a third signal port;
a second low-pass filter coupled between said first signal port and said third signal port; and
at least one selector for selectively coupling at least the first low-pass filter or the second low-pass filter between said first and third signal ports.

10. The diplexer of claim 9, wherein the at least one selector comprises a switch selected from the group consisting of transistors, diodes, electro-mechanical and mechanical switches.

11. The diplexer of claim 9, wherein each of said first and second low-pass filters comprise:
a plurality of inductors connected in series between said first and third signal ports, each of said inductors being coupled to ground via a respective capacitor forming thereby a plurality of single pole filter elements, a portion of said inductors being bypassed by respective capacitors.

12. The diplexer of claim 9, wherein said high-pass filter comprises:
a plurality of capacitors connected in series between said first and second signal ports, each of said capacitors being coupled to ground via serially coupled circuit elements forming thereby a plurality of single pole filter elements, each of said serially coupled circuit elements comprising a capacitor and inductor.

13. A method of passing bi-directional communications signals of differing modes, comprising:
providing a diplexer having a high-pass filter coupled between a first and a second signal port, a first and a second low-pass filter selectively coupled between the first and a third signal port, downstream processing circuitry coupled to the high-pass filter, and upstream processing circuitry selectively coupled to the first low-pass filter and the second low-pass filter, the downstream processing circuitry including a tuner, a demodulator, a first SAW filter selectively coupled between said tuner and said demodulator, and a second SAW filter selectively coupled between said tuner and said demodulator;
receiving downstream signals at the first signal port;
filtering the received downstream signals using said high-pass filter;
communicating filtered downstream signals to the second signal port;
receiving upstream signals at the third signal port;
selecting one of the first or second low-pass filters for filtering said received upstream signals in response to a desired communications mode; and
sending the filtered signals to the first signal port.

14. The method of claim 13, wherein the first SAW filter has a bandwidth of 6 MHz and the second SAW filter has a bandwidth of 8 MHz.

15. The method of claim 13, further comprising at least one first selector for selectively coupling the first SAW filter and the second SAW filter between the tuner and the demodulator.

16. The method of claim 13, wherein said high-pass filter passes signals greater than 88 MHz.

17. The method of claim 13, wherein the first low-pass filter passes signals less than 65 MHz and the second low-pass filter passes signals less than 42 MHz.

18. The method of claim 13, further comprising at least one selector for selectively coupling the first low-pass filter and the second low-pass filter to the upstream processing circuitry.

19. The method of claim 13, wherein said device is a cable modem.

20. The method of claim 13, wherein said device supports multiple standards.

21. A multi-mode bi-directional communications device, comprising:
means for providing a diplexer having a high-pass filter coupled between a first and a second signal port, a first and a second low-pass filter selectively coupled between the first and a third signal port, downstream processing circuitry coupled to the high-pass filter, and upstream processing circuitry selectively coupled to the first low-pass filter and the second low-pass filter, the downstream processing circuitry including a tuner, a demodulator, a first SAW filter selectively coupled between said tuner and said demodulator, and a second SAW filter selectively coupled between said tuner and said demodulator;
means for receiving downstream signals at the first signal port;
means for filtering the received downstream signals using said high-pass filter;
means for communicating filtered downstream signals to the second signal port;
means for receiving upstream signals at the third signal port;
means for selecting one of the first or second low-pass filters for filtering said received upstream signals in response to a desired communications mode; and
means for sending the filtered signals to the first signal port.

22. The device of claim 21, wherein the first SAW filter has a bandwidth of 6 MHz and the second SAW filter has a bandwidth of 8 MHz.

23. The device of claim 21, further comprising means for selectively coupling the first SAW filter and the second SAW filter between the tuner and the demodulator.

24. The device of claim 21, wherein said high-pass filter passes signals greater than 88 MHz.

25. The device of claim 21, wherein the first low-pass filter passes signals less than 65 MHz and the second low-pass filter passes signals less than 42 MHz.

26. The device of claim 21, further comprising means for selectively coupling the first low-pass filter and the second low-pass filter to the upstream processing circuitry.

27. The device of claim 21, wherein said device is a cable modem.

28. The device of claim 21, wherein said device supports multiple standards.

* * * * *